United States Patent
Nielsen et al.

(10) Patent No.: US 9,673,914 B2
(45) Date of Patent: Jun. 6, 2017

(54) METHOD AND APPARATUS FOR SPECTRAL STITCHING USING REFERENCE CHANNEL AND A PILOT TONE

(71) Applicant: Keysight Technologies, Inc., Minneapolis, MN (US)

(72) Inventors: Troels Studsgaard Nielsen, Aalborg (DK); Jan Verspecht, Londerzeel (BE); Keith F. Anderson, Santa Rosa, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 14/824,000

(22) Filed: Aug. 11, 2015

(65) Prior Publication Data

US 2017/0048006 A1    Feb. 16, 2017

(51) Int. Cl.
*H04B 3/46*    (2015.01)
*H04B 17/10*   (2015.01)
*H04L 27/10*   (2006.01)

(52) U.S. Cl.
CPC ........... *H04B 17/104* (2015.01); *H04L 27/10* (2013.01)

(58) Field of Classification Search
CPC ........ H04B 17/21; H04B 17/10; H04B 17/13; H04B 7/04; H03M 1/001; H03L 7/087; H04L 27/00; H04L 27/12; H04L 5/0048
USPC ..... 375/224, 340, 354, 260, 346; 324/76.23, 324/76.43, 756.01, 750.15; 455/67.11, 455/67.14, 313, 318, 316, 208, 255, 147, 455/296, 323, 86; 702/76, 75, 108
See application file for complete search history.

(56) References Cited

U.S. PATENT DOCUMENTS 3,968,427 A    7/1976  Sharrit
3,986,113 A   10/1976  Vifian
(Continued)

FOREIGN PATENT DOCUMENTS

EP    2 613 460 A1    10/2013

OTHER PUBLICATIONS

Mohammed El Yaagoubi et al., "Time-Domain Calibrated Measurements of Wideband Multisines Using a Large-Signal Network Analyzer," IEEE Transactions on Microwave Theory and Techniques, vol. 56, No. 5, May 2008, pp. 1180-1192.
Youngseo Ko et al., "Multi-Harmonic Broadband Measurements using an Large Signal Network Analyzer," IEEE Microwave Measurements Conference, May 28, 2010, pp. 1-6.
Peter Blockley et al., "Mixer-Based, Vector-Corrected, Vector Signal/Network Analyzer Offering 300kHz-20GHz Bandwidth and Traceable Phase Response," 2005 IEEE MTT-S International Microwave Symposium Digest, 2005, pp. 1497-1500.
(Continued)

*Primary Examiner* — Rahel Guarino

(57) ABSTRACT

A system and method sequentially measure the amplitude and phase of an output signal of a device under test in each of two or more frequency ranges which together span the output signal spectrum, using a local oscillator (LO) signal whose frequency changes for each measurement. The measured phase of the output signal is adjusted for at least one of the frequency ranges to account for a change of phase in the LO signal from measurement of one frequency range to another frequency range, including applying to the measured phase a phase offset determined by measuring the phase of a pilot tone using the LO signal before and after the frequency of the LO signal changes from measurement of one frequency range to another. The phase-adjusted measurements of the output signal in the two or more frequency ranges are stitched together to determine the amplitude and phase of the output signal across the output signal spectrum.

20 Claims, 8 Drawing Sheets

(56) References Cited

U.S. PATENT DOCUMENTS

| | | | |
|---|---|---|---|
| 6,018,702 | A | 1/2000 | Luiz |
| 7,801,505 | B2 | 9/2010 | VanWiggeren et al. |
| 8,155,904 | B2 | 4/2012 | Dvorak et al. |
| 8,588,703 | B2 | 11/2013 | Pickerd et al. |
| 8,849,602 | B2 | 9/2014 | Nishimura et al. |
| 8,891,639 | B2 | 11/2014 | Vanden Bossche |
| 9,252,895 | B1 | 2/2016 | Verspecht |
| 2005/0141626 | A1 | 6/2005 | Lee et al. |
| 2009/0216468 | A1 | 8/2009 | Anderson |
| 2012/0269252 | A1 | 10/2012 | Ward |
| 2013/0154611 | A1 | 6/2013 | Pate et al. |
| 2014/0050259 | A1 | 2/2014 | Azizi et al. |
| 2014/0269863 | A1 | 9/2014 | Fan et al. |
| 2014/0269882 | A1 | 9/2014 | Thompson et al. |
| 2015/0180416 | A1* | 6/2015 | Fernandez ............ G01R 27/28 455/326 |
| 2015/0312078 | A1 | 10/2015 | Bogdan |

OTHER PUBLICATIONS

Fabien De Groote et al., "Pulsed Multi-Tone Measurements for Time Domain Load Pull Characterizations of Power Transistors," IEEE Microwave Measurement Conference, 2009, pp. 1-4.
Quayle Office Action dated Jul. 15, 2016 for U.S. Appl. No. 14/981,861.
Office Action dated Nov. 10, 2016 for U.S. Appl. No. 14/823,985.
Notice of Allowance dated Sep. 12, 2016 for U.S. Appl. No. 14/981,861.
Notice of Allowance dated Jan. 5, 2017 for U.S. Appl. No. 14/981,861.
Office Action dated Jan. 31, 2017 for U.S. Appl. No. 14/848,971.
Yichi Zhang et al., "Dense Spectral Grid NVNA Phase Measurements Using Vector Signal Generators", IEEE Transactions on Instrumentation and Measurement, vol. 63, No. 12, Dec. 2014, pp. 2983-2992.

* cited by examiner

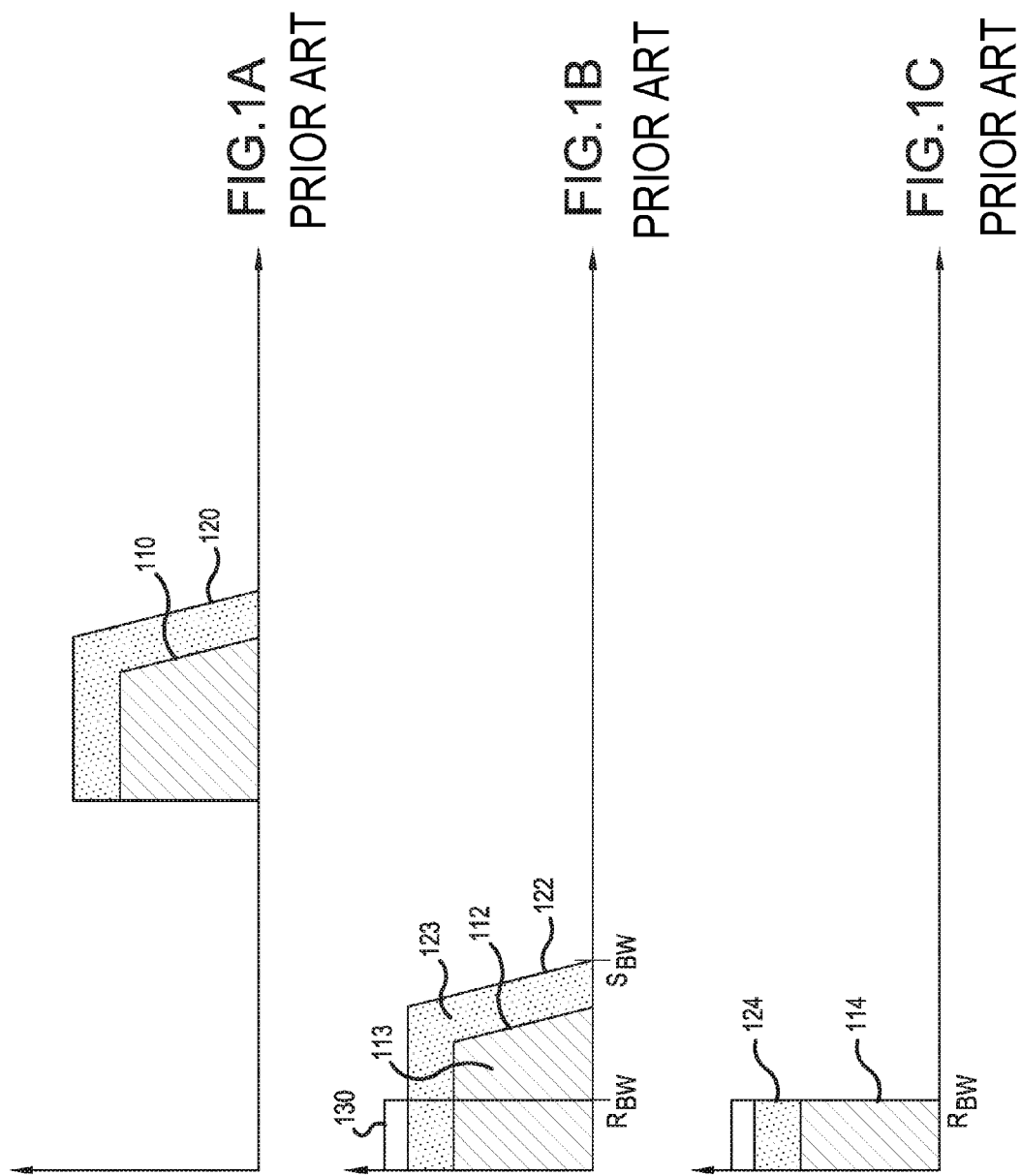

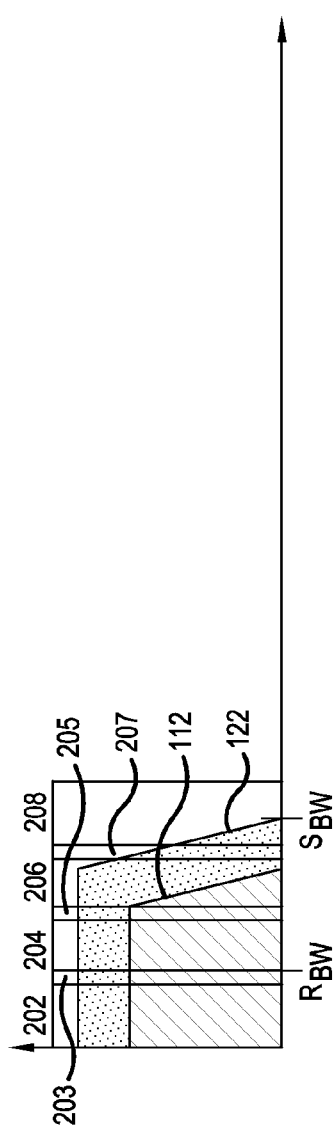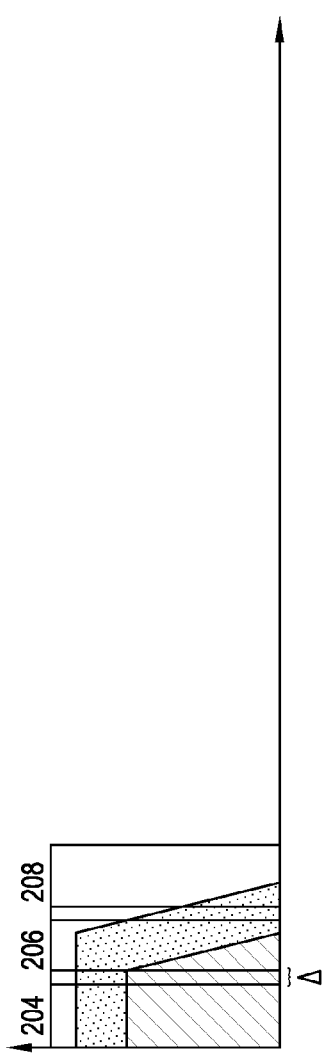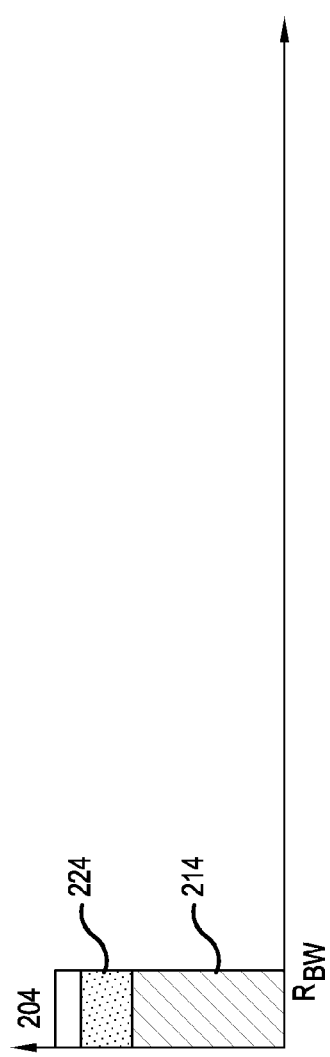

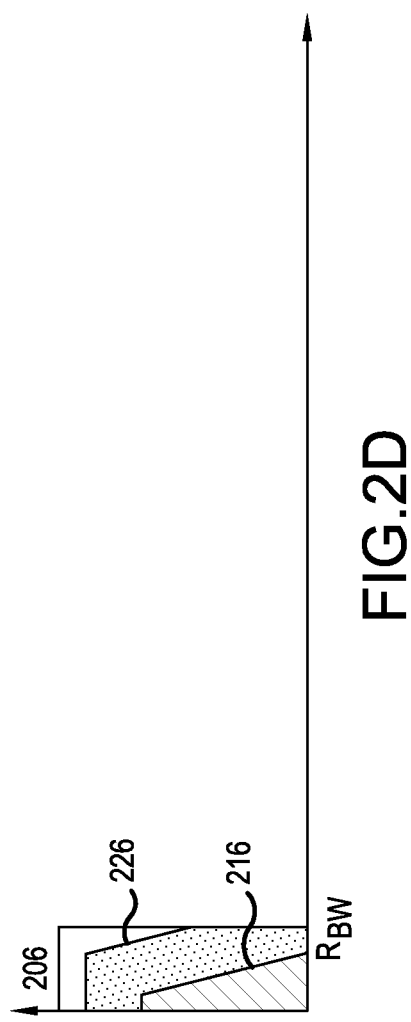

US 9,673,914 B2

METHOD AND APPARATUS FOR SPECTRAL STITCHING USING REFERENCE CHANNEL AND A PILOT TONE

BACKGROUND

In many situations, it is desired to be able to provide an accurate and complete measurement of one or more periodically modulated signals using a receiver or measurement device whose bandwidth is less than the bandwidth of the periodically modulated signal.

FIGS. 1A-C illustrate an example of this situation.

FIG. 1A shows an example frequency spectrum 110 of a periodically modulated input signal provided to a device under test (e.g., an amplifier) and an example frequency spectrum 120 of an output signal of the device under test. Here is illustrated an example where the bandwidth of the example frequency spectrum 120 of an output signal of the device under test is somewhat greater than the bandwidth of the spectrum 110 of a periodically modulated input signal, for example due to spectral regrowth in the device under test (e.g., an amplifier operating at least somewhat into compression). Of course it is understood that in general the bandwidth of the frequency spectrum of a periodically modulated input signal provided to a device under test and the bandwidth of the frequency spectrum of an output signal of the device under test may be the same as each other or different from each other.

FIG. 1B shows the example frequency spectrum 112 of the periodically modulated input signal, downconverted to baseband with a first mixing frequency (e.g., LO1), and the example frequency spectrum 122 of the output signal of the device under test, also downconverted to baseband with the first mixing frequency LO1, together with the spectrum of a filter 130 having the limited bandwidth $R_{BW}$ of a receiver which is used to measure and characterize the periodically modulated input signal and the output signal of the device under test. Here it is assumed the bandwidth of the downconverted output signal of the device under test is $S_{BW} > R_{BW}$.

FIG. 1C shows the portion 114 of the spectrum of the periodically modulated input signal and the portion 124 of the spectrum of the output signal of the device under test which are actually able to be measured and characterized by the receiver with the limited bandwidth $R_{BW}$. As denoted in FIG. 1B, a portion 113 of the spectrum of the periodically modulated input signal, and a portion 123 of the spectrum of the output signal of the device under test, are not measured by the receiver because of the limited bandwidth $R_{BW}$.

Thus it would be desirable to provide a convenient and reliable method and system to measure and characterize a periodically modulated signal, and an output signal of a device under test (DUT) produced in response to the periodically modulated signal, using a receiver whose bandwidth is less than the bandwidth of the periodically modulated signal itself and/or the bandwidth of the output signal. It would further be desirable to provide such a system and method which can provide accurate measurements of phase sensitive characteristics, such as the error-vector-magnitude (EVM), for a DUT.

SUMMARY

According to one aspect of the invention, a method comprises: receiving from a device under test (DUT) an output signal having an output signal spectrum; providing a pilot tone from a signal generator; sequentially converting portions of the output signal spectrum down to an intermediate frequency (IF) signal in a first IF channel by mixing the output signal with a local oscillator (LO) signal, wherein a frequency of the LO signal is changed for each sequential conversion, and measuring an amplitude and phase of the IF signal as a function of frequency for each of the sequentially converted portions of the output signal spectrum using a measurement device whose measurement bandwidth for any frequency of the LO signal is less than the bandwidth of the output signal spectrum; and mixing the pilot tone with the LO signal to produce a converted pilot tone in a second IF channel. The method further includes, during at least some of the sequential conversions, measuring a first phase of the converted pilot tone with the converted pilot tone at a first frequency in the second IF channel prior to changing the frequency of the LO signal, measuring a second phase of the converted pilot tone with the converted pilot tone at a second frequency in the second IF channel subsequent to changing the frequency of the LO signal, where the frequency of the pilot tone is maintained to be substantially the same in measuring the first phase of the converted pilot tone as in measuring the second phase of the converted pilot tone, and after measuring the first and second phases of the converted pilot tone, and before changing the frequency of the LO signal again, changing the frequency of the pilot tone such that the converted pilot tone is at the first frequency in the second IF channel. The method further includes adjusting the measured phase of the IF signal as a function of frequency for one or more of the sequentially converted portions of the output signal spectrum using the measured first and second phases of the pilot tone to produce phase-adjusted measurements of the IF signal; and stitching together the phase-adjusted measurements of the IF signal to produce a measurement of the amplitude and phase of the output signal across the output signal spectrum as a function of frequency.

In some embodiments, a first IF bandwidth of the first IF channel is approximately the same as a second IF bandwidth of the second IF channel.

In some embodiments, an amount by which the frequency of the LO signal is changed for each sequential conversion is about equal to a difference between the first frequency and the second frequency of the pilot tone.

In some embodiments, adjusting the measured phase of the IF signal as a function of frequency for one or more of the sequentially converted portions of the output signal spectrum using the measured first and second phases of the converted pilot tone comprises: for at least a current one of the sequential conversions, determining a phase adjustment to be applied to the measured phase of the IF signal as a function of frequency as a difference between: (1) the first phase of the converted pilot tone with the converted pilot tone at the first frequency, as measured for the current sequential conversion, and (2) the second phase of the converted pilot tone with the converted pilot tone at the second frequency, as measured for an immediately preceding sequential conversion; and applying the determined phase adjustment to the measured phase of the IF signal as a function of frequency for the current sequential conversion.

In some embodiments, the method further comprises: receiving a second signal, having a second signal spectrum; during each sequential conversion of the portions of the output signal spectrum, sequentially converting portions of the second signal spectrum down to a second intermediate frequency (IF) signal in a third IF channel by mixing the second signal with the LO signal, and measuring an amplitude and phase of the second IF signal as a function of frequency for each of the sequentially converted portions of the second signal spectrum using a second measurement device whose measurement bandwidth for any frequency of the LO signal is less than a bandwidth of the second signal spectrum; adjusting the measured phase of the second IF signal as a function of frequency for one or more of the sequentially converted portions of the second signal spectrum using the measured first and second phases of the pilot tone to produce phase-adjusted measurements of the second IF signal; and stitching together the phase-adjusted measurements of the second IF signal to produce a measurement of the amplitude and phase of the second signal across the second signal spectrum as a function of frequency, wherein the second signal is one of: an input signal which is also supplied to an input of the device under test and in response to which the device under test generates the output signal; a reflected signal produced from the input of the device under test; and a reflected signal produced from an output of the device under test.

In some embodiments, measuring the amplitude and phase of the IF signal as a function of frequency comprises: sampling the IF signal at a sample rate, digitizing the samples of the IF signal, and performing a digital Fourier transform on the digitized samples of the IF signal.

In some versions of these embodiments, an input signal supplied to an input of the device under test in response to which the device under test generates the output signal is a periodic signal, and each sample is synchronized to occur at a same point in the periodic signal for each measurement of each portion of the output signal spectrum.

In some embodiments, measuring the first phase of the converted pilot tone and measuring the second phase of the converted pilot tone each comprise: sampling the second IF channel at a sample rate, digitizing the samples of the second IF channel, and performing a digital Fourier transform on the digitized samples of the second IF channel.

According to another aspect of the invention, a system is provided for measuring at least one characteristic of an output signal of a device under test (DUT), the output signal having an output signal spectrum. The system comprises: a local oscillator (LO) configured to generate an LO signal having an LO frequency; a signal generator configured to generate a pilot tone; a first frequency converter configured to mix the output signal with the LO signal to produce an intermediate frequency (IF) signal in a first IF channel; a second frequency converter configured to mix the pilot tone with the LO signal to produce converted pilot tone within a second IF channel; a first measurement device connected to an output of the first frequency converter, the first measurement device having a measurement bandwidth which for any frequency of the LO signal is less than the bandwidth of the output signal spectrum; a second measurement device connected to an output of the second frequency converter; and a controller. The controller is configured to control the system to: sequentially convert portions of the output signal spectrum down to the IF signal by controlling the LO to change the LO frequency for each sequential conversion, and measure an amplitude and phase of the IF signal as a function of frequency for each of the sequentially converted portions of the output signal spectrum with the first measurement device. The controller is further configured to, during at least some of the sequential conversions: employ the second measurement device to measure a first phase of the converted pilot tone with the converted pilot tone at a first frequency in the second IF channel prior to changing the frequency of the LO signal, employ the second measurement device to measure a second phase of the converted pilot tone with the converted pilot tone at a second frequency in the second IF channel subsequent to changing the frequency of the LO signal, where the frequency of the pilot tone is maintained to be substantially the same in measuring the first phase of the converted pilot tone as in measuring the second phase of the converted pilot tone, and after measuring the first and second phases of the converted pilot tone, and before changing the frequency of the LO signal again, controlling the signal generator to change the frequency of the pilot tone such that the converted pilot tone is at the first frequency in the second IF channel. The system is configured to adjust the measured phase of the IF signal as a function of frequency for one or more of the sequentially converted portions of the output signal spectrum using the measured first and second phases of the pilot tone to produce phase-adjusted measurements of the IF signal, and to stitch together the phase-adjusted measurements of the IF signal to produce a measurement of the amplitude and phase of the output signal across the output signal spectrum as a function of frequency.

In some embodiments, a first IF bandwidth of the first IF channel is approximately the same as a second IF bandwidth of the second IF channel.

In some embodiments, the controller is configured to change the LO frequency for each sequential conversion by an amount which is about equal to a difference between the first frequency and the second frequency of the pilot tone.

In some embodiments, the system is configured to adjust the measured phase of the IF signal as a function of frequency for one or more of the sequentially converted portions of the output signal spectrum using the measured first and second phases of the pilot tone: for at least a current one of the sequential conversions, determining a phase adjustment to be applied to the measured phase of the IF signal as a function of frequency as a difference between: (1) the first phase of the converted pilot tone with the converted pilot tone at the first frequency, as measured for the current sequential conversion, and (2) the second phase of the converted pilot tone with the converted pilot tone at the second frequency, as measured for an immediately preceding sequential conversion; and applying the determined phase adjustment to the measured phase of the IF signal as a function of frequency for the current sequential conversion.

In some embodiments, the system further comprises a third frequency converter configured to mix a second signal to a second intermediate frequency (IF) signal in a third IF channel; and a third measurement device connected to an output of the third frequency converter and configured to measure an amplitude and phase of the second IF signal as a function of frequency for each of the sequential conversions, wherein the third measurement device has a measurement bandwidth which for any frequency of the LO signal is less than the bandwidth of the second signal spectrum, and wherein the second signal is one of: an input signal which is also supplied to an input of the device under test and in response to which the device under test generates the output signal; a reflected signal produced from the input of the device under test; and a reflected signal produced from the output of the device under test.

In some embodiments, the first frequency converter comprises: a first mixer having two inputs connected respectively to an output of the DUT and an output of the LO, and having an output; and a first low pass filter having an input connected to the output of the first mixer and having an output for outputting the IF signal.

In some embodiments, the first measurement device comprises: a sampler connected to the output of the first frequency converter and configured to sample the IF signal to produce IF samples; an analog-to-digital converter configured to digitize the IF samples; and a digital signal processor configured to perform a digital Fourier transform on the digitized samples of the IF signal configured to determine the amplitude and phase of the IF signal as a function of frequency.

In some versions of these embodiments, the system further includes a trigger input configured to control timing of the sampler, wherein an input signal supplied to the device under test in response to which the device under test generates the output signal is a periodic signal, and wherein the sampler is synchronized to sample the IF signal at a same point in the periodic signal for each measurement of each portion of the output signal spectrum.

According to still another aspect of the invention, a method comprises: receiving from a device under test (DUT) an output signal having an output signal spectrum, the output signal spectrum comprising at least two frequency ranges which together span the output signal spectrum; sequentially measuring an amplitude and a phase of the output signal as a function of frequency in each of the frequency ranges using a local oscillator (LO) signal whose frequency and phase are changed for each sequential measurement; adjusting a measured phase of the output signal as a function of frequency for at least one of the frequency ranges to account for the change of phase in the LO signal from measurement of one frequency range to measurement of a next frequency range to produce phase-adjusted measurements of the output signal; and stitching together the phase-adjusted measurements of the output signal as a function of frequency in each of the frequency ranges to produce a measurement of the amplitude and phase of the output signal as a function of frequency across the output signal spectrum. Adjusting the measured phase as a function of frequency for at least one of the frequency ranges to account for the change of phase in the LO signal includes applying to the measured phase a phase offset determined from a first phase and a second phase of a pilot tone using the LO signal which are measured, respectively, before and after the frequency and phase of the LO signal change from measurement of one frequency range to measurement of the next frequency range. The frequency of the pilot tone is maintained to be substantially the same in measuring the first phase of the converted pilot tone as in measuring the second phase of the converted pilot tone.

In some embodiments, the method further comprises, after measuring the first and second phases of the pilot tone, and before changing the frequency of the LO signal again, changing the frequency of the pilot tone, wherein an amount by which the frequency of the LO signal is changed for each sequential measurement is about equal to an amount by the which the frequency of the pilot tone is changed.

In embodiments, the method further comprises: receiving a second signal; sequentially measuring an amplitude and phase of the second signal as a function of frequency in each of the frequency ranges using the local oscillator (LO) signal whose frequency and phase are changed for each sequential measurement; adjusting a measured phase of the second signal as a function of frequency for at least one of the frequency ranges to account for the change of phase in the LO signal from measurement of one frequency range to measurement of a next frequency range to produce phase-adjusted measurements of the second signal; and stitching together the phase-adjusted measurements of the second signal as a function of frequency in each of the frequency ranges to produce a measurement of the amplitude and phase of the second signal as a function of frequency, wherein adjusting the measured phase of the second signal as a function of frequency for at least one of the frequency ranges to account for the change of phase in the LO signal includes applying the phase offset to the measured phase of the second signal, and wherein the second signal is one of: an input signal which is also supplied to an input of the device under test and in response to which the device under test generates the output signal; a reflected signal produced from the input of the device under test; and a reflected signal produced from the output of the device under test.

In some embodiments, the phase offset is a difference between: (1) the first phase of the pilot tone measured prior to changing the frequency of the LO signal in a preceding measurement, and (2) the second phase of the pilot tone measured after changing the frequency of the LO signal in a current measurement.

BRIEF DESCRIPTION OF THE DRAWINGS

The example embodiments are best understood from the following detailed description when read with the accompanying drawing figures. In fact, the dimensions may be arbitrarily increased or decreased for clarity of discussion. Wherever applicable and practical, like reference numerals refer to like elements.

FIGS. 1A, 1B and 1C illustrate an example of downconverting and measuring a spectrum with a measurement device having a limited bandwidth.

FIGS. 2A, 2B, 2C, 2D and 2E illustrate an example embodiment of a process of performing multiple downversions of overlapping portions of an input signal and output signal spectrum to measure the input and output signal with a measurement device having a limited bandwidth.

DETAILED DESCRIPTION

Figure 3:
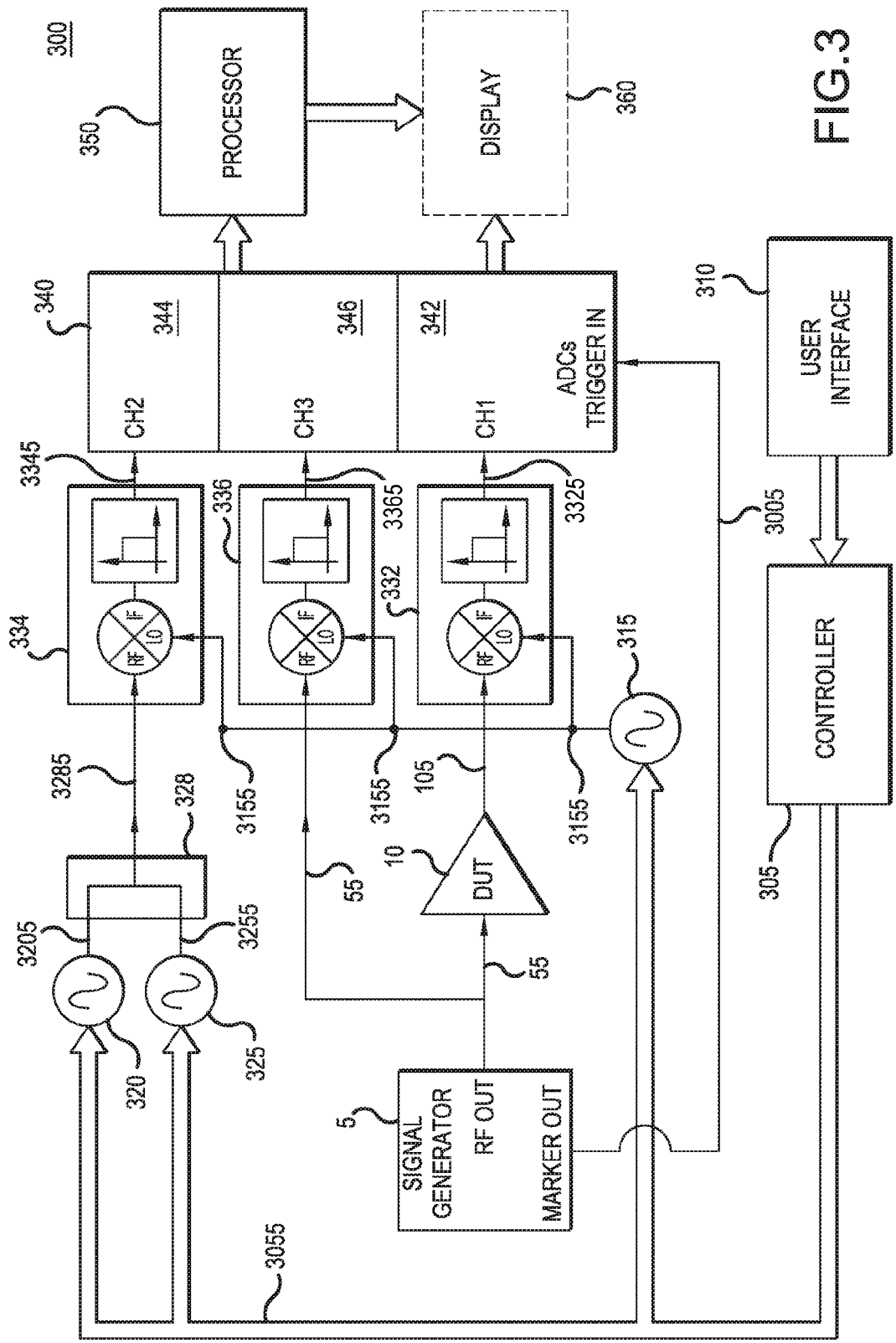
FIG. 3 illustrates an example embodiment of a measurement system for measuring a spectrum of a signal from a device under test, where the bandwidth of a measurement device of the measurement system is less than the bandwidth of the signal to be measured.

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparati and methods may be omitted so as to not obscure the description of the example embodiments. Such methods and apparati are clearly within the scope of the present teachings.

Unless otherwise noted, when a first device is said to be connected to a second device, this encompasses cases where one or more intermediate devices may be employed to connect the two devices to each other. However, when a first device is said to be directly connected to a second device, this encompasses only cases where the two devices are connected to each other without any intermediate or intervening devices. Similarly, when a signal is said to be coupled to a device, this encompasses cases where one or more intermediate devices may be employed to couple the signal to the device. However, when a signal is said to be directly coupled to a device, this encompasses only cases where the signal is directly coupled to the device without any intermediate or intervening devices.

As noted above, in some cases it is desired to be able to provide an accurate and complete measurement of one or more periodically modulated signals using a receiver whose bandwidth is less than the bandwidth of the periodically modulated signal. As an example, it may be desired to measure the error-vector-magnitude (EVM) of a power amplifier which is excited by a contiguously aggregated 5-carrier LTE-A signal having a bandwidth of 100 MHz using a receiver whose bandwidth $R_{BW}$ is only 40 MHz. Because of spectral regrowth, the total bandwidth of the output signal of the amplifier could easily exceed 300 MHz.

If the output signal was simply downconverted to baseband and then processed by the receiver, the part of the spectrum of the signal which extends beyond the receiver's bandwidth of 40 MHz would be filtered out, and so the signal will not be measured or characterized correctly.

One technique to overcome this problem is spectral stitching. Spectral stitching involves performing multiple, separate, downversions of overlapping portions of the signal's spectrum using different downconversion mixing frequencies, and then stitching together the measurements of all of the overlapping portions in order to produce an overall measurement of the entire spectrum of the signal. The bandwidth of each of the portions is less than or equal to the bandwidth of the measurement receiver. For example, if the bandwidth of the signal's spectrum, $S_{BW}$, is 100 MHz, and the bandwidth of the measurement receiver, $R_{BW}$, is 30 MHz, then at least four separate downconversions for measuring at least four different portions of the signal spectrum are required. These four measurements can then be "spectrally stitched" together to produce a measurement of the entire signal spectrum of 100 MHz. In general, the number, N, of measurements of separate downconverted portions of the signal spectrum which must be performed is:

$$N = \left\lceil \frac{S_{BW}}{R_{BW} - \Delta} \right\rceil, \quad (1)$$

where ⌈ ⌉ is the ceiling function, and wherein Δ is the minimum amount of overlap required for the adjacent spectral measurements.

FIGS. 2A-2E illustrate an example embodiment of a process of performing multiple, separate, downversions of overlapping portions of an input signal spectrum and an output signal spectrum to measure the input and output signal with a measurement device having a limited bandwidth, that is a bandwidth which is less than the bandwidth of the signal(s) to be measured. In particular, FIGS. 2A-2E illustrate an example embodiment of a process of performing multiple, separate (sequential), downversions of overlapping portions of the example frequency spectrum 102 of a periodically modulated input signal which is supplied or provided to a device under test (DUT) (e.g., an amplifier) and the example frequency spectrum 104 of an output signal of the DUT which were discussed above with respect to FIGS. 1A-C.

FIG. 2A illustrates the frequency spectrum 112 of a periodically modulated input signal provided to a DUT (e.g., an amplifier), downconverted to baseband with a first mixing frequency (e.g., LO1), and the example frequency spectrum 122 of an output signal of the DUT, also downconverted to baseband with the first mixing frequency LO1, as was shown above in FIG. 1B.

FIG. 2A further illustrates how the downconverted frequency spectrum 122 of the output signal of the DUT can be divided into four overlapping portions or frequency ranges: 202, 204, 206 and 208, which each include an overlap region and which together span the frequency spectrum of the output signal. The overlap regions include: a first overlap region 203 for portions 202 and 204; a second overlap region 205 for portions 204 and 206; and a third overlap region 207 for portions 206 and 208. Of course the downconverted frequency spectrum 112 of the periodically modulated input signal also can be divided into overlapping portions, but for the sake of simplified description, the discussion below follows the downconverted frequency spectrum 122 of the output signal of the DUT.

As described above with respect to FIG. 1C above, when the downconverted frequency spectrum 122 of the output signal of the DUT is provided to a receiver with a limited bandwidth $R_{BW}$, then only the portion 202 is measured by the receiver.

However, as illustrated in FIGS. 2B-E, by repeating the downconversion process with different mixing frequencies, LO2, LO3 and LO4, each of the portions 204, 206 and 208 may be measured separately, and then all of the measured portions 202, 204, 206 and 208 may be stitched together as explained above to reproduce the original output signal frequency spectrum 122.

In particular, FIG. 2B illustrates the frequency spectrum 120 of the output signal of the DUT downconverted to baseband with a second mixing frequency (e.g., LO2), where here:

$$|LO2 - LO1| = R_{BW} - \Delta \quad (2)$$

FIG. 2C then shows the portion 204 of the frequency spectrum 120 of the output signal of the DUT which is actually able to be measured and characterized by the receiver with the limited bandwidth $R_{BW}$.

Similarly, FIG. 2D shows the portion 206 of the frequency spectrum 120 of the output signal of the DUT which is actually able to be measured and characterized by the receiver with the limited bandwidth $R_{BW}$ when the frequency spectrum 120 of the output signal of the DUT is downconverted to baseband with a third mixing frequency (e.g., LO3), where here:

$$|LO3 - LO2| = R_{BW} - \Delta \quad (3)$$

Finally, FIG. 2E shows the portion 208 of the frequency spectrum 120 of the output signal of the DUT which is actually able to be measured and characterized by the receiver with the limited bandwidth $R_{BW}$ when the frequency spectrum 120 of the output signal of the DUT is downconverted to baseband with a fourth mixing frequency (e.g., LO4), where here:

$$|LO4-LO3|=R_{BW}-\Delta \quad (4)$$

As explained above, the frequency spectrum 120 of the output signal of the DUT can be reconstructed by spectrally stitching together the measurements of the overlapping portions 202, 204, 206 and 208.

However, in general there will be unknown phase shifts between the mixing frequencies LO1, LO2, LO3 and LO4 used for the four separate downconversions. In that case, although it is possible to reconstruct the amplitude of the output signal of the DUT as a function of frequency by stitching together the amplitude measurements of the four overlapping portions 202, 204, 206 and 208, reconstructing the phase of the output signal of the DUT as a function of frequency is not possible due to the above-mentioned unknown phase shifts being introduced into the measured phases of the four overlapping portions or frequency ranges 202, 204, 206 and 208. This prevents the measurement of phase-sensitive characteristics such as error-vector-magnitude (EVM).

Accordingly, it would be desirable to provide a system and method of spectral stitching which can further correct for unknown phase shifts between the mixing (LO) frequencies used for the various separate downconversions of the overlapping portions of the spectrum in the spectral stitching process.

FIG. 3 illustrates an example embodiment of a measurement system 300 for measuring at least one characteristic, e.g., a spectrum, of a signal from a device under test, where the bandwidth of a measurement device in measurement system 300 is less than the bandwidth of the signal to be measured. Measurement system 300 includes: a controller 305; a user interface 310; a local oscillator 315; a signal generator 320; a first frequency converter 332; a second frequency converter 334; a third frequency converter 336; a measurement instrument 340; a processor 350; and a display 360.

Controller 305 may include one or more processing elements (e.g., CPUs), memory (including volatile and/or nonvolatile memory), and a communication interface for communicating with local oscillator 315 and signal generator 320. The memory may store therein instructions for causing the processor(s) to control operations of system 300, for example to perform various operations and methods described herein such as with respect to FIGS. 4-6 below. In some embodiments, controller 305 may communicate commands to local oscillator 315 and signal generator 320 to set or adjust their output frequencies, amplitudes, etc. via a communication connection or bus 3055. Such communications may employ any of a variety of standard protocols such as General Purpose Interface Bus (GPIB)/IEEE-488, LAN eXtensions for Instrumentation (LXI), VME eXtensions for Instrumentation (VXI), PCI eXtensions for Instrumentation (PXI), universal serial bus (USB), FireWire, Ethernet, TCP/IP, etc.

In some embodiments, user interface 310 allows a user to program and/or set operating parameters for controller 305. For example, where controller 305 executes an algorithm which controls the output frequencies of local oscillator 315 and signal generator 320, in some embodiments a user may enter the frequencies via user interface 310. User interface 310 may include any combination of well known input devices and output devices, such as a keyboard, mouse, trackball, keypad, pushbuttons, one or more display devices (which may include LCD readouts), etc.

In some embodiments, controller 305 and user interface 310 may be integrated into a single device, such as a computer, laptop, tablet, smartphone, etc.

Local oscillator 315 and signal generator 320 may each comprise a programmable frequency generator generating a signal whose frequency is programmable, for example under control of controller 305 and/or via input controls integrated into the device.

Local oscillator 315 generates or produces a local oscillator (LO) signal 3155, and signal generator 320 generates or produces a pilot tone 3205.

First frequency converter 332, second frequency converter 334 (also referred to as a reference or pilot frequency converter), and third frequency converter 336 each include a mixer and a low pass filter (LPF). Each of the mixers has two inputs, including a first input which receives LO signal 3155, and an output. The output of each mixer is connected to an input of the corresponding LPF, and the output of each LPF is at the output of the corresponding frequency converter. Beneficially, the bandwidths of the LPFs in first frequency converter 332, second frequency converter 334, and third frequency converter 336 may all be the same, or approximately the same, as each other.

First frequency converter 332 is also configured, or connected, to receive an output signal 105 of device under test (DUT) 10 (e.g., an amplifier). More specifically, output signal 105 is provided to the second input of the mixer of first frequency converter 332 and the mixer is configured to mix output signal 105 with LO signal 3155 to produce an intermediate frequency (IF) signal, also referred to herein as first IF signal, in a first IF channel 3325 at the output of the mixer. The input of the LPF receives the first IF signal, and the output of the LPF outputs the first IF signal at the output of first frequency converter 332.

Second frequency converter 334 (reference frequency converter) is configured, or connected, to receive pilot tone 3205. More specifically, pilot tone 3205 is provided to the second input of the mixer of second frequency converter 334 and the mixer is configured to mix pilot tone 3205 with LO signal 3155 to produce a converted pilot tone in a second IF channel 3345 (also referred to as a reference channel) at the output of the mixer. The input of the LPF receives the converted pilot tone, and the output of the LPF outputs the converted pilot tone at the output of second frequency converter 334.

Third frequency converter 336 is configured, or connected, to receive a second signal and to mix the second signal with LO signal 3155 to produce a second intermediate frequency (IF) signal in a third IF channel 3365 at the output of the LPF. In the illustrated embodiment, the second signal is a periodically modulated input signal 55 provided to DUT 10 by periodic signal generator 5. However in other embodiments, the second signal may a reflected signal produced from the input of DUT 10, or a reflected signal produced from the output of DUT 10. More specifically, in the illustrated embodiment input signal 55 is provided to the second input of the mixer of third frequency converter 336 and the mixer is configured to mix input signal 55 with LO signal 3155 to produce the second IF signal in third IF channel 3365 at the output of the mixer. The input of the LPF receives the second IF signal, and the output of the LPF outputs the second IF signal at the output of third frequency converter 336.

Measurement instrument 340 includes a first measurement device 342, a second measurement device 344 (also referred to as a reference measurement device), and a third measurement device 346.

First measurement device 342, second measurement device 344, and third measurement device 346 may each comprise a sampler, an analog-to-digital converter (ADC) and memory. In some embodiments, memory may be shared among first measurement device 342, second measurement device 344, and third measurement device 346. In particular first measurement device 342 is configured to sample and digitize first IF channel 3325 and produce a plurality of data samples at an operating frequency of the sampler and ADC. Second measurement device 344 is configured to sample and digitize second IF channel 3345 and produce a plurality of data samples at an operating frequency of the sampler and ADC. Third measurement device 346 is configured to sample and digitize third IF channel 3365 and produce a plurality of data samples at an operating frequency of the sampler and ADC. The data samples may be stored in memory for subsequent processing by measurement instrument 340 and/or processor 350. Beneficially, the operating frequencies of all of the samplers/ADCs, and the bandwidths of first measurement device 342, second measurement device 344, and third measurement device 346 may all be the same as each other. Beneficially, the bandwidths of the LPFs in first frequency converter 332, second frequency converter 334, and third frequency converter 336 may be selected to match the operating bandwidths of the ADCs in first measurement device 342, second measurement device 344, and third measurement device 346. In some embodiments, first measurement device 342, second measurement device 344, and third measurement device 346 each may include a digital signal processor which is configured to perform a Fourier transform (e.g., a digital Fourier transform) on data samples output by the ADC.

Processor 350 may include one or more processing elements (e.g., CPUs) and memory, including volatile and/or nonvolatile memory, which may store instructions to be executed by the processing element(s). Processor 350 is configured to process the data samples from first measurement device 342, second measurement device 344, and third measurement device 346 to provide measurements of output signal 105 and the second signal (e.g., input signal 55) provided to third measurement device 346. In some embodiments, processor 350 may include one or more digital signal processors configured to perform a Fourier transform (e.g., a digital Fourier transform) on data samples from each of the first measurement device 342, second measurement device 344, and third measurement device 346. In some embodiments, processor 350 may process the data samples from first measurement device 342 and second measurement device 344 to stitch together phase-adjusted measurements of the first IF signal in first IF channel 3325 to produce a measurement of the amplitude and phase of output signal 105 across the output spectrum as a function of frequency.

In some embodiments, processor 350 and controller 305 may be combined, and may share processing resources, including memory, one or more processors, and/or user interface 310.

Display 360 is configured to display waveforms generated by processor 350 from ADC data produced by measurement instrument 340. In some embodiments, display 360 may be combined with, or part of, user interface 310.

Operations of system 300 for measuring or characterizing one or more signals related to DUT 10 will now be described.

Here it is assumed that the signal bandwidth $S_{BW}$ of output signal 105 is wider than the receiver bandwidth $R_{BW}$ of first measurement device 342, which may be limited by the maximum conversion rate of an ADC which is included in first measurement device 342. Furthermore, it is assumed here that the signal bandwidth $S_{BW}$ of input signal 55 is also wider than the receiver bandwidth $R_{BW}$ of third measurement device 346. It is further assumed that input signal 55 is a periodically modulated signal. It is also assumed that signal generator 5, local oscillator 315, and signal generator 320 are all frequency locked or synchronized to a common master reference frequency (e.g., 10 MHz), for example provided by a master reference frequency generator (not shown in FIG. 3) to which all of these components are connected. Finally, it is assumed that any systematic phase dispersions in IF channels 3325/3345/3365 are corrected for by system 300, for example by means of a system calibration procedure.

In operation, input signal 55 and output signal 105 are each converted to a corresponding IF signal at a lower frequency in a corresponding IF channel 3325/3365 by first and third frequency converters 332 and 336, respectively. In particular, first and third frequency converters 332 and 336 mix input signal 55 and output signal 105, respectively, with LO signal 3155, and then low pass filter the output of the mixer. The IF signals in IF channels 3325 and 3365 are then sampled and digitized by a corresponding pair of ADCs in first and second measurement devices 342 and 346 to produce ADC data. Processor 350 converts the ADC data to frequency domain date by performing a digital Fourier transform (DFT) on the ADC data.

The ADCs in first and third measurement devices 342 and 346 are synchronized with each other, and are further synchronized to the modulation period of input signal 55. One method to realize the synchronization is by using a "marker out" signal 3005 output by signal generator 5 and provided to measurement instrument 340, which uses it as a trigger signal for the ADCs. Other methods can be used to realize the synchronization. Beneficially, each sample made by the samplers and ADCs may be synchronized to occur at a same point in the period of periodic input signal 55 for each measurement of each portion (e.g., 202, 204, 206 and 208) of frequency spectrum 122 of output signal 105.

In order to measure the complete spectra of input signal 55 and output signal 105, the spectra will be divided into two or more overlapping portions or frequency ranges (e.g., 202, 204, 206 and 208) which are each individually measured and then stitched together, as described above.

However it is a challenge, as described above, to reconstruct the phase of input signal 55 and output signal 105 across their bandwidth from the measured phase of each portion of the spectrum. Every one of these measurements of a different portion of the spectrum of output signal 105 or input signal 55 will be made with a different LO frequency, and in general when the LO frequency is changed, an arbitrary and unknown phase shift occurs in LO signal 3155. When the phase measurements of the different portions are stitched together, these phase shifts produce errors in the phase measurement of the overall spectrum unless they are corrected. It should be noted that the same LO signal 3155 is used by both first and third frequency converters 332 and 336.

System 300 addresses this challenge by measuring the phase shifts of LO signal 3155 when the LO frequency is changed from one measurement to the next through the use of second frequency converter 334 (reference frequency converter), second measurement device 344 (reference measurement device), and pilot tone 3205 generated by signal generator 320. System 300 (e.g., by means of processor 350): (1) adjusts the measured phase of the IF signal(s) in IF channels 3325/3365 as a function of frequency for one or more of the sequentially converted portions of the output signal spectrum using by applying to the measured phase a phase offset determined from measured phases of the converted pilot tone 3205 to account for the change of phase in LO signal 3155 from measurement of one portion (or frequency range) to measurement of a next portion (or frequency range), to thereby produce phase-adjusted measurements of the IF signal; and (2) stitches together the phase-adjusted measurements of the IF signal(s) to produce a measurement of the amplitude and phase of input signal 55 across the input spectrum, and/or output signal 105 across the output spectrum, as a function of frequency.

A concrete example will now be provided to better illustrate various aspects of embodiments of the systems and methods disclosed herein. In this example, the overall frequency spectrum of the signal being measured is divided into N=4 portions which are measured separately or sequentially, and stitched together to produce an overall spectrum of a signal which is being measured. However it should be understood that in general N may be any integer greater than 1.

Figure 4:
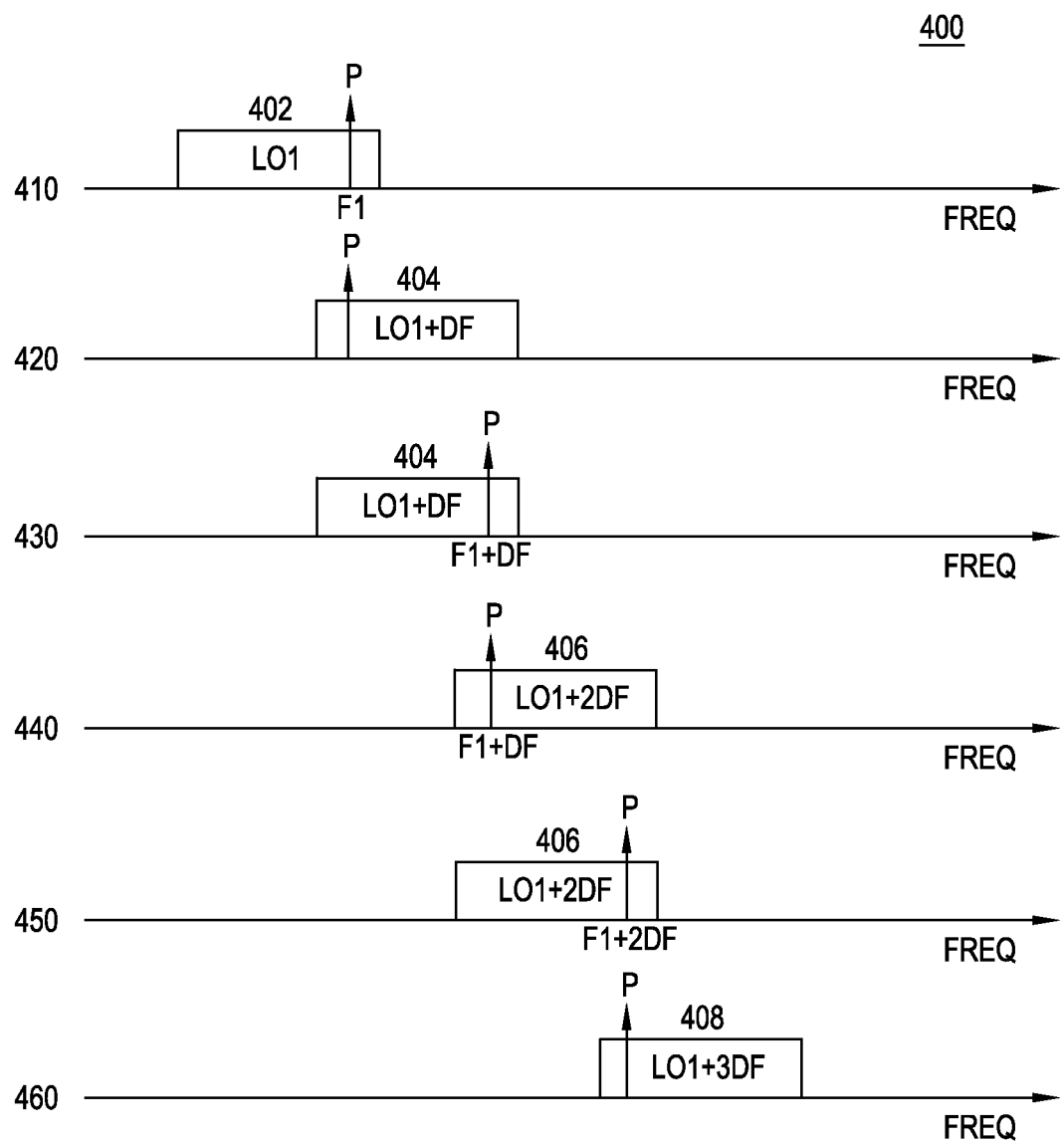
FIG. 4 illustrates an example embodiment of a method of measuring a spectrum of a signal from a device under test, where the bandwidth of the measurement device is less than the bandwidth of the signal to be measured, by stitching together measurements of four overlapping portions of the spectrum.

FIG. 4 illustrates an example embodiment of a method 400 of measuring a spectrum of a signal from a device under test, where the bandwidth of the measurement device is less than the bandwidth of the signal to be measured, by stitching together measurements of four overlapping portions of the spectrum.

In an operation 410, when measuring a first portion of the spectrum (e.g., first portion 202 in FIG. 2A), the LO frequency of LO signal 3155 is set (e.g. by controller 305) to LO1. The frequency of pilot tone 3205 (also referred to as P) is set (e.g., by controller 305) to a frequency F1 such that the downconverted pilot tone 3205 appears in the upper part of second IF channel 3345 (which mirrors first IF channel 3325 and third IF channel 3365), in particular a region (e.g., overlap region 203) of the first portion of the spectrum which overlaps with a second portion of the spectrum (e.g., second portion 204 in FIGS. 2A-2C) to be measured next. Measurement instrument 340 measures: the first IF signal in first IF channel 3325 representing the downconverted first portion of output signal 105; the second IF signal in third IF channel 3365 representing the downconverted first portion of input signal 55; and the downconverted pilot tone 3205 in second IF channel 3345. Measurement instrument 340 or processor 350 obtains the amplitude and phase ($PH_I1$) of the downconverted first portion of the spectrum of input signal 55, the amplitude and phase ($PH_O1$) of the downconverted first portion of the spectrum of output signal 105, and the amplitude and phase (P1) of the downconverted pilot tone 3205. Measurement instrument 340 or processor 350 sets the corrected phase ($C_I1$) of the first portion of the spectrum of input signal 55 to equal $PH_I1$, and sets the corrected phase ($C_O1$) of the first portion of the spectrum of output signal 105 to equal $PH_O1$. The phase-adjusted data for the first portion of the spectrum of input signal 55 and the phase-adjusted data for the first portion of the spectrum of output signal 105 may be stored in memory.

Next, in an operation 420, the LO frequency of LO signal 3155 is set (e.g., by controller 305) to LO2=LO1+DF. The frequency of pilot tone 3205 is maintained to be substantially the same as in the immediately preceding conversion or operation 410. Here, when we say that the frequency of pilot tone 3205 is maintained to be substantially the same as in an immediately preceding conversion, this indicates that the frequency remains the same except for any minor frequency drift within the tolerances of signal generator 320. For example, controller 305 may not issue any command in operation 420 to signal generator 320 to change the frequency of pilot tone 3205, and accordingly signal generator 320 continues to output pilot tone 3205 whose frequency is not changed with respect to immediately preceding operation 410. As explained below, by maintaining the frequency of pilot tone 3205 unchanged between operations 410 and 420, a reference point can be established for factoring out an effect caused by a change in the phase of LO signal 3155 which occurs in general between operations 410 and 420 due to the output frequency of local oscillator 315 being changed or reprogrammed, for example by controller 305.

Because the frequency of LO signal 3155 is changed in operation 420 while the frequency of pilot tone 3205 remains substantially unchanged, downconverted pilot tone 3205 now appears in the lower part of second IF channel 3345 (which, again, mirrors first IF channel 3325 and third IF channel 3365), in particular it appears in overlap region 203 in particular a region (e.g., overlap region 203) of the second portion of the spectrum which overlaps with the first portion of the spectrum which was measured in operation 410. Measurement instrument 340 measures: the first IF signal in first IF channel 3325 representing the downconverted second portion of output signal 105; the second IF signal in third IF channel 3365 representing the downconverted second portion of input signal 55; and the downconverted pilot tone 3205 in second IF channel 3345. Measurement instrument 340 or processor 350 obtains the amplitude and phase ($PH_I2$) of the downconverted second portion of the spectrum of input signal 55, the amplitude and phase ($PH_O2$) of the downconverted second portion of the spectrum of output signal 105, the amplitude and phase (P2) of the downconverted pilot tone 3205. Measurement instrument 340 or processor 350 calculates a phase correction or fixed phase shift, T1, to be applied to all of the measured spectra, which may be stored in memory. Here, T1=P1−P2. Measurement instrument 340 or processor 350 calculates the adjusted (or corrected) phase ($C_I2$) of the second portion of the spectrum of input signal 55 to equal $PH_I2+T1$, and calculates the adjusted (or corrected) phase ($C_O2$) of the second portion of the spectrum of output signal 105 to equal $PH_O2+T1$. The phase-adjusted data for the second portion of the spectrum of input signal 55 and the phase-adjusted data for the second portion of the spectrum of output signal 105 may be stored in memory.

Next, in an operation 430, the frequency of pilot tone 3205 is adjusted or changed (e.g., by controller 305) to a frequency F1+DF such that the downconverted pilot tone 3205 now appears again in the upper part of second IF channel 3345, in particular a region (e.g., overlap region 205) of the second portion of the spectrum which overlaps with a third portion of the spectrum (e.g., third portion 206 in FIGS. 2A-2C) to be measured next. Measurement instrument 340 measures the downconverted pilot tone 3205 in second IF channel 3345, and measurement instrument 340 or processor 350 obtains the amplitude and phase (P3) of the downconverted pilot tone 3205. The value of P3 may be stored in memory.

Next, in an operation 440, the LO frequency of LO signal 3155 is set (e.g., by controller 305) to LO3=LO1+2DF. The frequency of pilot tone 3205 is maintained to be substantially the same as in the immediately preceding conversion or operation 430. Because the frequency of LO signal 3155 is changed in operation 440 while the frequency of pilot tone 3205 remains substantially unchanged, downconverted pilot tone 3205 now appears again in the lower part of second IF channel 3345, in particular a region (e.g., overlap region 205) of the third portion of the spectrum which overlaps with the second portion of the spectrum which was measured in operation 420. Measurement instrument 340 measures: the first IF signal in first IF channel 3325 representing the downconverted third portion of output signal 105; the second IF signal in third IF channel 3365 representing the downconverted third portion of input signal 55; and the downconverted pilot tone 3205 in second IF channel 3345. Measurement instrument 340 or processor 350 obtains the amplitude and phase ($PH_I3$) of the downconverted third portion of the spectrum of input signal 55, the amplitude and phase ($PH_O3$) of the downconverted third portion of the spectrum of output signal 105, the amplitude and phase (P4) of the downconverted pilot tone 3205. Measurement instrument 340 or processor 350 calculates a phase correction or fixed phase shift, T2, to be applied to all of the measured spectra, which may be stored in memory. Here, T2=T1+P3−P4. Measurement instrument 340 or processor 350 calculates the adjusted (or corrected) phase ($C_I3$) of the third portion of the spectrum of input signal 55 to equal $PH_I3$+T2, and calculates the adjusted (or corrected) phase ($C_O3$) of the third portion of the spectrum of output signal 105 to equal $PH_O3$+T2. The phase-adjusted data for the third portion of the spectrum of input signal 55 and the phase-adjusted data for the third portion of the spectrum of output signal 105 may be stored in memory.

Next, in an operation 450, the frequency of pilot tone 3205 is adjusted or changed (e.g., by controller 305) to a frequency F1+2DF such that the downconverted pilot tone 3205 now appears again in the upper part of second IF channel 3345, in particular a region (e.g., overlap region 207) of the third portion of the spectrum which overlaps with a fourth portion of the spectrum (e.g., fourth portion 208 in FIGS. 2A-2C) to be measured next. Measurement instrument 340 measures the downconverted pilot tone 3205 in second IF channel 3345, and measurement instrument 340 or processor 350 obtains the amplitude and phase (P5) of the downconverted pilot tone 3205. The value of P5 may be stored in memory.

Next, in an operation 460, the LO frequency of LO signal 3155 is set (e.g., by controller 305) to LO3=LO1+3DF. The frequency of pilot tone 3205 is maintained to be substantially the same as in the immediately preceding conversion or operation 450. Because the frequency of LO signal 3155 is changed in operation 460 while the frequency of pilot tone 3205 remains substantially unchanged, downconverted pilot tone 3205 now appears again in the lower part of second IF channel 3345, in particular a region (e.g., overlap region 207) of the fourth portion of the spectrum which overlaps with the third portion of the spectrum which was measured in operation 440. Measurement instrument 340 measures: the first IF signal in first IF channel 3325 representing the downconverted fourth portion of output signal 105; the second IF signal in third IF channel 3365 representing the downconverted fourth portion of input signal 55; and the downconverted pilot tone 3205 in second IF channel 3345. Measurement instrument 340 or processor 350 obtains the amplitude and phase ($PH_I4$) of the downconverted fourth portion of the spectrum of input signal 55, the amplitude and phase ($PH_O4$) of the downconverted fourth portion of the spectrum of output signal 105, the amplitude and phase (P6) of the downconverted pilot tone 3205. Measurement instrument 340 or processor 350 calculates a phase correction or fixed phase shift, T3, to be applied to all of the measured spectra, which may be stored in memory. Here, T3=T2+P5−P6. Measurement instrument 340 or processor 350 calculates the adjusted (or corrected) phase ($C_I4$) of the fourth portion of the spectrum of input signal 55 to equal $PH_I4$+T3, and calculates the adjusted (or corrected) phase ($C_O4$) of the fourth portion of the spectrum of output signal 105 to equal $PH_O4$+T3. The phase-adjusted data for the fourth portion of the spectrum of input signal 55 and the phase-adjusted data for the fourth portion of the spectrum of output signal 105 may be stored in memory.

In general, this procedure is repeated until all N portions of the spectra of input signal 55 and output signal 105 are measured. The phase-adjusted data for all N portions of the spectrum of input signal 55 are stitched together to produce the input signal spectrum, and the phase-adjusted data for all N portions of the spectrum of output signal 105 are stitched together to produce the output signal spectrum.

Figure 5A:
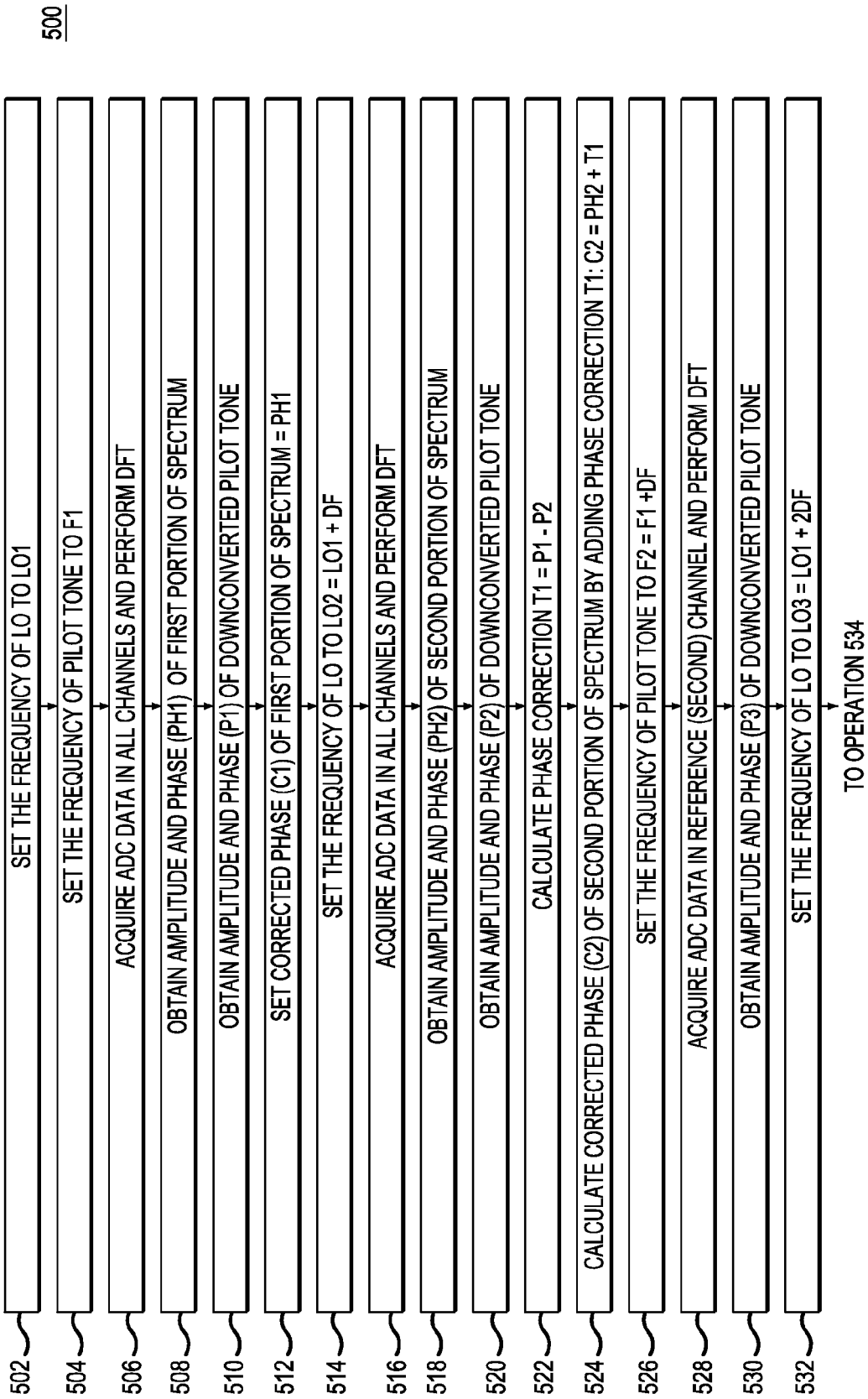
FIGS. 5A and 5B show a flowchart of a method of measuring a spectrum of a signal from a device under test, where the bandwidth of the measurement device is less than the bandwidth of the signal to be measured, by stitching together measurements of four overlapping portions of the spectrum.
Figure 5B:
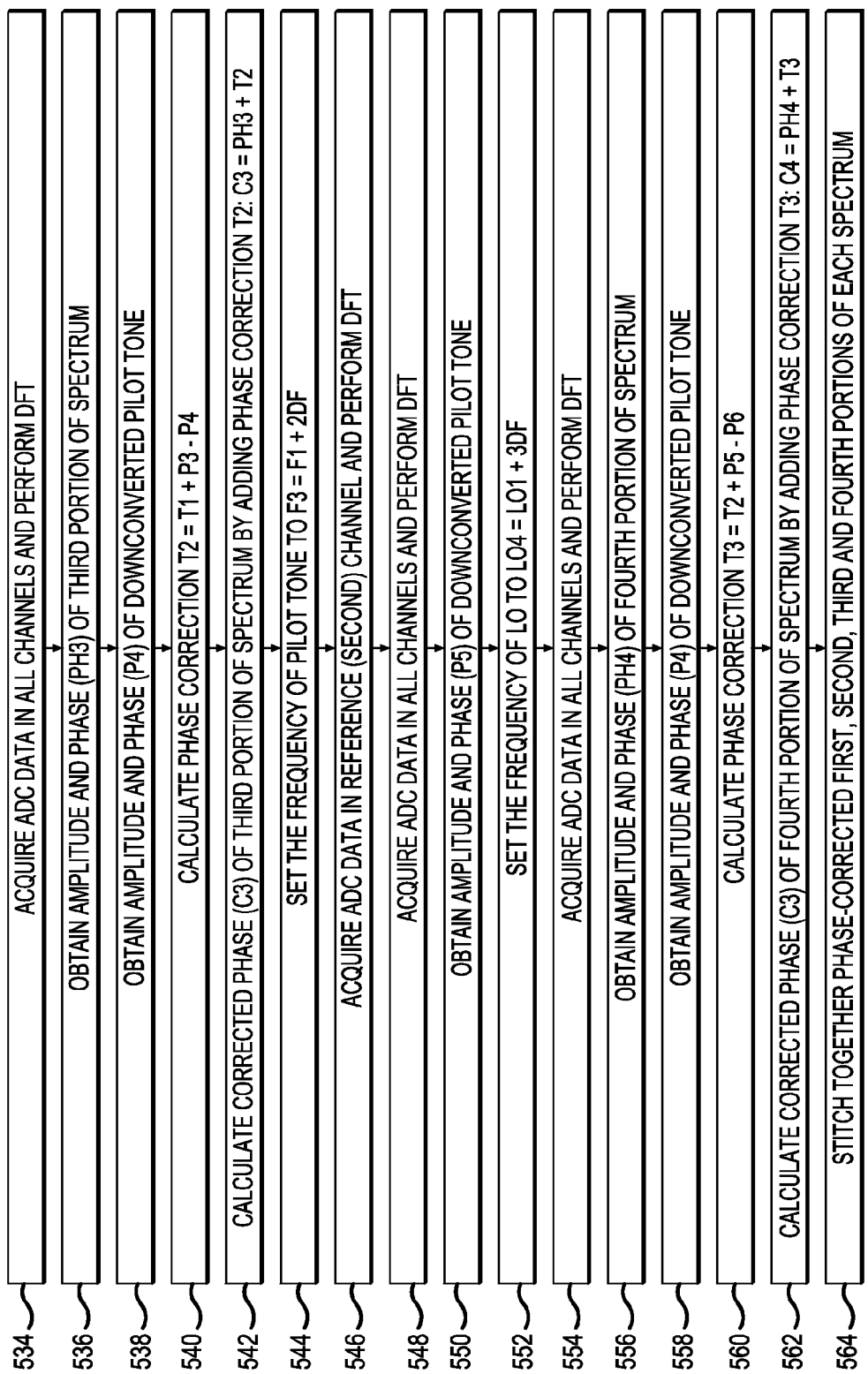

FIGS. 5A and 5B show a flowchart of a method 500 of measuring a spectrum of a signal from a device under test, where the bandwidth of the measurement device is less than the bandwidth of the signal to be measured, by stitching together measurements of four overlapping portions of the spectrum. In particular, the method 500 comprises an embodiment of detailed steps for the method 400 shown in FIG. 4.

An operation 502 includes setting the frequency of LO signal 3155 to LO1. In some embodiments, this operation may be performed by controller 305 sending a command to local oscillator 315 via communication bus 3055.

An operation 504 includes setting the frequency of pilot tone 3205 to F1. In some embodiments, this operation may be performed by controller 305 sending a command to signal generator 320 via communication bus 3055.

An operation 506 includes acquiring ADC data for all IF channels, and performing a digital Fourier transform (DFT) on the ADC data. For example, the ADC data for output signal 105 may be obtained by first measurement device 342 sampling the first IF signal in first IF channel 3325 at a sample rate, and digitizing the sample. In various embodiments, measurement instrument 340 or processor 350 may perform the digital Fourier transform on the digitized samples of the first IF signal (also referred to as digitized IF samples).

An operation 508 includes obtaining the amplitude and phase of the first portion of the spectrum for each signal being measured. In various embodiments, operation 508 may be performed by measurement instrument 340 and/or processor 350.

An operation 510 includes obtaining an amplitude and a first phase of the downconverted pilot tone 3205 with pilot tone 3205 at frequency F1. In some embodiments, operation 510 may be performed by measurement instrument 340 and/or processor 350.

An operation 512 includes setting an adjusted or corrected phase of the first portion of the spectrum of each signal which is being measured to be equal to the measured phase which was obtained in operation 510. In some embodiments, operation 512 may be performed by measurement instrument 340 and/or processor 350.

An operation 514 includes setting the frequency of LO signal 3155 to LO2=LO1+DF. In some embodiments, this operation may be performed by controller 305 sending a command to local oscillator 315 via communication bus 3055.

An operation 516 includes acquiring ADC data for all IF channels, and performing a digital Fourier transform (DFT) on the ADC data. For example, the ADC data for output signal 105 may be obtained by first measurement device 332 sampling the first IF signal in first IF channel 3325 at a sample rate, and digitizing the sample. In various embodiments, measurement instrument 340 or processor 350 may perform the digital Fourier transform on the digitized samples of the first IF signal (also referred to as digitized IF samples).

An operation 518 includes obtaining the amplitude and phase of the second portion of the spectrum for each signal being measured. In various embodiments, operation 508 may be performed by measurement instrument 340 and/or processor 350.

An operation 520 includes obtaining an amplitude and a second phase of the downconverted pilot tone 3205 with pilot tone 3205 at frequency F1. In some embodiments, operation 510 may be performed by measurement instrument 340 and/or processor 350.

An operation 522 includes calculating a phase correction T1=measured first phase of the downconverted pilot tone 3205 in operation 510−measured second phase of the downconverted pilot tone 3205 in operation 520. In some embodiments, operation 522 may be performed by measurement instrument 340 and/or processor 350.

An operation 524 includes calculating an adjusted or corrected phase of the second portion of the spectrum of each signal which is being measured by adding the phase correction T1 to the measured phase of the second portion of the spectrum of each signal which is being measured.

An operation 526 includes setting the frequency of pilot tone 3205 to F2=F1+DF. In some embodiments, this operation may be performed by controller 305 sending a command to signal generator 320 via communication bus 3055.

An operation 528 includes acquiring ADC data for the downconverted pilot tone 3205 in second IF channel 3345, and performing a discrete Fourier transform (e.g., a digital Fourier transform). For example, the ADC data for second IF channel 3345 may be obtained by first measurement device 332 sampling second IF channel 3345 at a sample rate, and digitizing the sample. In some embodiments, measurement instrument 340 or processor 350 performs a digital Fourier transform on the digitized samples of the downconverted pilot tone 3205.

An operation 530 includes obtaining the amplitude and first phase of the downconverted pilot tone 3205 with pilot tone 3205 at frequency F2. In some embodiments, operation 530 may be performed by measurement instrument 340 and/or processor 350.

An operation 532 includes setting the frequency of LO signal 3155 to LO2=LO1+2DF. In some embodiments, this operation may be performed by controller 305 sending a command to local oscillator 315 via communication bus 3055.

An operation 534 includes acquiring ADC data for all IF channels, and performing a digital Fourier transform (DFT) on the ADC data. For example, the ADC data for output signal 105 may be obtained by first measurement device 332 sampling the first IF signal in first IF channel 3325 at a sample rate, and digitizing the sample. In various embodiments, measurement instrument 340 or processor 350 may perform the digital Fourier transform on the digitized samples of the first IF signal (also referred to as digitized IF samples).

An operation 536 includes obtaining the amplitude and phase of the third portion of the spectrum for each signal being measured. In various embodiments, operation 536 may be performed by measurement instrument 340 and/or processor 350.

An operation 538 includes obtaining an amplitude and a second phase of the downconverted pilot tone 3205 with pilot tone 3205 at frequency F2. In some embodiments, operation 538 may be performed by measurement instrument 340 and/or processor 350.

An operation 540 includes calculating a phase correction T2=T1+measured first phase of the downconverted pilot tone 3205 in operation 530−measured second phase of the downconverted pilot tone 3205 in operation 538. In some embodiments, operation 540 may be performed by measurement instrument 340 and/or processor 350.

An operation 542 includes calculating an adjusted or corrected phase of the third portion of the spectrum of each signal which is being measured by adding the phase correction T2 to the measured phase of the third portion of the spectrum of each signal which is being measured.

An operation 544 includes setting the frequency of pilot tone 3205 to F3=F1+2DF. In some embodiments, this operation may be performed by controller 305 sending a command to signal generator 320 via communication bus 3055.

An operation 546 includes acquiring ADC data for the downconverted pilot tone 3205 in second IF channel 3345, and performing a discrete Fourier transform (e.g., a digital Fourier transform). For example, the ADC data for second IF channel 3345 may be obtained by first measurement device 332 sampling second IF channel 3345 at a sample rate, and digitizing the sample. In some embodiments, measurement instrument 340 or processor 350 performs a digital Fourier transform on the digitized samples of the downconverted pilot tone 3205.

An operation 548 includes obtaining the amplitude and first phase of the downconverted pilot tone 3205 with pilot tone 3205 at frequency F3. In some embodiments, operation 530 may be performed by measurement instrument 340 and/or processor 350.

An operation 550 includes setting the frequency of LO signal 3155 to LO2=LO1+3DF. In some embodiments, this operation may be performed by controller 305 sending a command to local oscillator 315 via communication bus 3055.

An operation 552 includes acquiring ADC data for all IF channels, and performing a digital Fourier transform (DFT) on the ADC data. For example, the ADC data for output signal 105 may be obtained by first measurement device 332 sampling the first IF signal in first IF channel 3325 at a sample rate, and digitizing the sample. In various embodiments, measurement instrument 340 or processor 350 may perform the digital Fourier transform on the digitized samples of the first IF signal (also referred to as digitized IF samples).

An operation 554 includes obtaining the amplitude and phase of the fourth portion of the spectrum for each signal being measured. In various embodiments, operation 554 may be performed by measurement instrument 340 and/or processor 350.

An operation 556 includes obtaining an amplitude and a second phase of the downconverted pilot tone 3205 with pilot tone 3205 at frequency F3. In some embodiments, operation 556 may be performed by measurement instrument 340 and/or processor 350.

An operation 558 includes calculating a phase correction T3=T2+measured first phase of the downconverted pilot tone 3205 in operation 548−measured second phase of the downconverted pilot tone 3205 in operation 556. In some embodiments, operation 558 may be performed by measurement instrument 340 and/or processor 350.

An operation 560 includes calculating an adjusted or corrected phase of the fourth portion of the spectrum of each signal which is being measured by adding the phase correction T3 to the measured phase of the fourth portion of the spectrum of each signal which is being measured.

An operation 562 includes stitching together the phase-adjusted first, second, third and fourth portions of the spectra as obtained above to reconstruct the overall spectra of each of the signals which is being measured.

Figure 6:
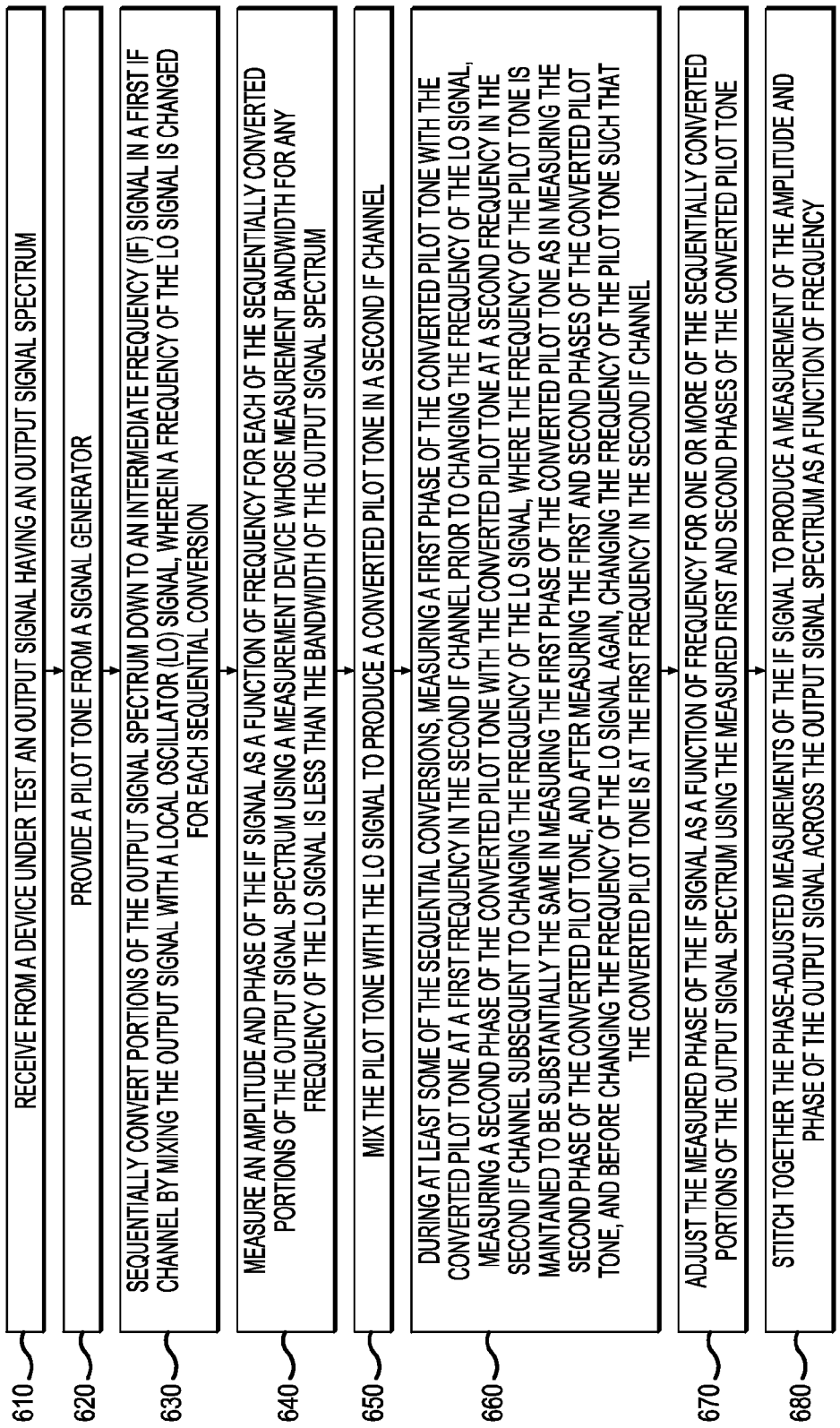
FIG. 6 illustrates a series of operations which may be performed using the measurement system of FIG. 3 in one example embodiment of a method of measuring a spectrum of a signal from a device under test, where the bandwidth of the measurement device is less than the bandwidth of the signal to be measured.

FIG. 6 illustrates a series of operations which may be performed using the system 300 of FIG. 3 in one example embodiment of a method 600 of measuring a spectrum of a signal from a device under test, where the bandwidth of the measurement device is less than the bandwidth of the signal to be measured.

An operation 610 may include receiving from device under test (DUT) 10 output signal 105 having an output signal spectrum (e.g., frequency spectrum 120).

An operation 620 may include providing pilot tone 3205 from signal generator 320.

An operation 630 may include first frequency converter 332 sequentially converting portions (e.g., portions 202, 204, 206 and 208) of the output signal spectrum down to an intermediate frequency (IF) signal in first IF channel 3325 by mixing output signal 105 with local oscillator (LO) signal 3155, wherein a frequency of LO signal 3155 is changed for each sequential conversion. Beneficially, the amount by which the frequency of LO signal 3155 is changed for each sequential conversion is less than the bandwidth(s) of portions 202, 204, 206 and 208 of the output signal spectrum such that a converted overlapping region 203, 205 or 207 appears in first IF channel 3325 in each sequential conversion.

An operation 640 may measure an amplitude and phase of the IF signal in first IF channel 3325 as a function of frequency for each of the sequentially converted portions of the output signal spectrum using first measurement device 342 whose measurement bandwidth for any fixed frequency of the LO signal is less than the bandwidth of the output signal spectrum. Beneficially, measuring the amplitude and phase of the IF signal as a function of frequency includes: sampling the IF signal at a sample rate, digitizing the samples of the IF signal, and performing a digital Fourier transform on the digitized samples of the IF signal.

An operation 650 may include mixing pilot tone 3205 with LO signal 3155 to produce a converted pilot tone in second IF channel 3345.

An operation 660 may include, during at least some of the sequential conversions: (1) measuring a first phase of the converted pilot tone with the converted pilot tone at a first frequency in second IF channel 3345 prior to changing the frequency of LO signal 3155; (2) measuring a second phase of the converted pilot tone with the converted pilot tone at a second frequency in second IF channel 3345 subsequent to changing the frequency of LO signal 3155, where the frequency of pilot tone 3205 is maintained to be substantially the same in measuring the first phase of the converted pilot tone as in measuring the second phase of the converted pilot tone, and (3) after measuring the first and second phases of the converted pilot tone, and before changing the frequency of LO signal 3155 again, changing the frequency of pilot tone 3205 such that the converted pilot tone is at the first frequency in second IF channel 3345.

An operation 670 may include processor 350 adjusting the measured phase of the IF signal as a function of frequency for one or more of the sequentially converted portions of the output signal spectrum using the measured first and second phases of the converted pilot tone to produce phase-adjusted measurements of the IF signal in first IF channel 3325. Beneficially, adjusting the measured phase of the IF signal as a function of frequency for one or more of the sequentially converted portions of the output signal spectrum using the measured first and second phases of the converted pilot tone 3205 includes: for at least a current one of the sequential conversions, determining a phase adjustment to be applied to the measured phase of the IF signal as a function of frequency as a difference between: (1) the first phase of the converted pilot tone 3205 with the converted pilot tone at the first frequency, as measured for the current sequential conversion, and (2) the second phase of the converted pilot tone 3205 with the converted pilot tone at the second frequency, as measured for an immediately preceding sequential conversion; and applying the determined phase adjustment to the measured phase of the IF signal as a function of frequency for the current sequential conversion. Beneficially, the phase-adjusted measurements of the IF signal represent phase-adjusted measurements of output signal 105 from which the IF signal in first IF channel 3325 was produced.

An operation 680 may include processor 350 stitching together the phase-adjusted measurements of the IF signal to produce a measurement of the amplitude and phase of output signal 105 across the output spectrum as a function of frequency.

The method 600 may include other operations, for example operations related to characterizing a second signal (e.g., input signal 55 in response to which DUT 10 generates output signal 105; a reflected signal produced from the input of the DUT 10; a reflected signal produced from the output of DUT 10; etc.) in addition to output signal 105, for example by performing similar operations to operations for 610, 630, 640, 670 and 680, for the second signal.

While example embodiments are disclosed herein, one of ordinary skill in the art appreciates that many variations that are in accordance with the present teachings are possible and remain within the scope of the appended claims. The invention therefore is not to be restricted except within the scope of the appended claims.

The invention claimed is:

1. A method comprising:
receiving from a device under test (DUT) an output signal having an output signal spectrum;
providing a pilot tone having a pilot frequency from a signal generator;
sequentially converting portions of the output signal spectrum down to an intermediate frequency (IF) signal in a first IF channel by mixing the output signal with a local oscillator (LO) signal, wherein a frequency of the LO signal is changed for each sequential conversion, and measuring an amplitude and phase of the IF signal as a function of frequency for each of the sequentially converted portions of the output signal spectrum using a measurement device whose measurement bandwidth for any frequency of the LO signal is less than a bandwidth of the output signal spectrum;
mixing the pilot tone with the LO signal to produce a converted pilot tone in a second IF channel,
during at least some of the sequential conversions,
measuring a first phase of the converted pilot tone with the converted pilot tone at a first frequency in the second IF channel prior to changing the frequency of the LO signal,
measuring a second phase of the converted pilot tone with the converted pilot tone at a second frequency in the second IF channel subsequent to changing the frequency of the LO signal, wherein the pilot frequency of the pilot tone remains substantially unchanged in measuring the first phase of the converted pilot tone as in measuring the second phase of the converted pilot tone, and after measuring the first and second phases of the converted pilot tone, and before changing the frequency of the LO signal again, changing the pilot frequency of the pilot tone such that the converted pilot tone is at the first frequency in the second IF channel, adjusting the measured phase of the IF signal as the function of frequency for one or more of the sequentially converted portions of the output signal spectrum using the measured first and second phases of the converted pilot tone to produce phase-adjusted measurements of the IF signal; and stitching together the phase-adjusted measurements of the IF signal to produce a measurement of the amplitude and phase of the output signal across the output signal spectrum as a function of frequency.

2. The method of claim 1, wherein a first IF bandwidth of the first IF channel approximately matches a second IF bandwidth of the second IF channel.

3. The method of claim 1, wherein an amount by which the frequency of the LO signal is changed for each sequential conversion is about equal to a difference between the first frequency and the second frequency of the converted pilot tone.

4. The method of claim 1, wherein adjusting the measured phase of the IF signal as the function of frequency for one or more of the sequentially converted portions of the output signal spectrum using the measured first and second phases of the converted pilot tone comprises:

for at least a current one of the sequential conversions, determining a phase adjustment to be applied to the measured phase of the IF signal as a function of frequency as a difference between: (1) the first phase of the converted pilot tone with the converted pilot tone at the first frequency, as measured for the current sequential conversion, and (2) the second phase of the converted pilot tone with the converted pilot tone at the second frequency, as measured for an immediately preceding sequential conversion; and applying the determined phase adjustment to the measured phase of the IF signal as the function of frequency for the current sequential conversion.

5. The method of claim 1, further comprising:

receiving a second signal, having a second signal spectrum;

during each sequential conversion of the portions of the output signal spectrum, sequentially converting portions of the second signal spectrum down to a second IF signal in a third IF channel by mixing the second signal with the LO signal, and measuring an amplitude and phase of the second IF signal as a function of frequency for each of the sequentially converted portions of the second signal spectrum using a second measurement device whose measurement bandwidth for any frequency of the LO signal is less than a bandwidth of the second signal spectrum;

adjusting the measured phase of the second IF signal as the function of frequency for one or more of the sequentially converted portions of the second signal spectrum using the measured first and second phases of the pilot tone to produce phase-adjusted measurements of the second IF signal; and stitching together the phase-adjusted measurements of the second IF signal to produce a measurement of the amplitude and phase of the second signal across the second signal spectrum as a function of frequency, wherein the second signal is one of: an input signal which is also supplied to an input of the device under test and in response to which the device under test generates the output signal; a reflected signal produced from the input of the device under test; and a reflected signal produced from an output of the device under test.

6. The method of claim 1, wherein measuring the amplitude and phase of the IF signal as the function of frequency for each of the sequentially converted portions of the output signal spectrum comprises:

sampling the IF signal at a sample rate to produce samples of the IF signal, digitizing the samples of the IF signal, and performing a digital Fourier transform on the digitized samples of the IF signal.

7. The method of claim 6, wherein an input signal supplied to an input of the device under test in response to which the device under test generates the output signal is a periodic signal, and wherein each sample is synchronized to occur at a same point in the periodic signal for each measurement of each portion of the output signal spectrum.

8. The method of claim 1, wherein measuring the first phase of the converted pilot tone and measuring the second phase of the converted pilot tone each comprise:

sampling the second IF channel at a sample rate to produce samples of the IF signal, digitizing the samples of the second IF channel, and performing a digital Fourier transform on the digitized samples of the second IF channel.

9. A system for measuring at least one characteristic of an output signal of a device under test (DUT), the output signal having an output signal spectrum, the system comprising:

a local oscillator (LO) configured to generate an LO signal having an LO frequency;

a signal generator configured to generate a pilot tone having a pilot tone frequency;

a first frequency converter configured to mix the output signal with the LO signal to produce an intermediate frequency (IF) signal in a first IF channel;

a second frequency converter configured to mix the pilot tone with the LO signal to produce a converted pilot tone within a second IF channel having a converted pilot tone frequency;

a first measurement device connected to an output of the first frequency converter, the first measurement device having a measurement bandwidth which for any LO frequency of the LO signal is less than a bandwidth of the output signal spectrum;

a second measurement device connected to an output of the second frequency converter;

a controller configured to control the system to:

sequentially convert portions of the output signal spectrum down to the IF signal by controlling the LO to change the LO frequency for each sequential conversion, and measure an amplitude and phase of the IF signal as a function of frequency for each of the sequentially converted portions of the output signal spectrum with the first measurement device, and during at least some of the sequential conversions:

employ the second measurement device to measure a first phase of the converted pilot tone with the converted pilot tone frequency at a first frequency in the second IF channel prior to changing the frequency of the LO signal, employ the second measurement device to measure a second phase of the converted pilot tone with the converted pilot tone frequency at a second frequency in the second IF channel subsequent to changing the LO frequency of the LO signal, where the pilot tone frequency of the pilot tone remains substantially unchanged in measuring the first phase and second phases of the converted pilot tone, and after measuring the first and second phases of the converted pilot tone, and before changing the LO frequency of the LO signal again, controlling the signal generator to change the pilot tone frequency of the pilot tone such that the converted pilot tone frequency is at the first frequency in the second IF channel, wherein the system is configured to adjust the measured phase of the IF signal as the function of frequency for one or more of the sequentially converted portions of the output signal spectrum using the measured first and second phases of the converted pilot tone to produce phase-adjusted measurements of the IF signal, and to stitch together the phase-adjusted measurements of the IF signal to produce a measurement of the amplitude and phase of the output signal across the output signal spectrum as a function of frequency.

10. The system of claim 9, wherein a first IF bandwidth of the first IF channel approximately matches a second IF bandwidth of the second IF channel.

11. The system of claim 9, wherein the controller is configured to change the LO frequency for each sequential conversion by an amount which is about equal to a difference between the first frequency and the second frequency of the converted pilot tone.

12. The system of claim 9, wherein the system is configured to adjust the measured phase of the IF signal as the function of frequency for one or more of the sequentially converted portions of the output signal spectrum using the measured first and second phases of the converted pilot tone by:

for at least a current one of the sequential conversions, determining a phase adjustment to be applied to the measured phase of the IF signal as a function of frequency as a difference between: (1) the first phase of the converted pilot tone with the converted pilot tone at the first frequency, as measured for the current sequential conversion, and (2) the second phase of the converted pilot tone with the converted pilot tone at the second frequency, as measured for an immediately preceding sequential conversion; and applying the determined phase adjustment to the measured phase of the IF signal as the function of frequency for the current sequential conversion.

13. The system of claim 9, further comprising:

a third frequency converter configured to mix a second signal to a second IF signal in a third IF channel; and a third measurement device connected to an output of the third frequency converter and configured to measure an amplitude and phase of the second IF signal as a function of frequency for each of the sequential conversions, wherein the third measurement device has a measurement bandwidth which for any frequency of the LO signal is less than a bandwidth of the second signal spectrum, and wherein the second signal is one of: an input signal which is also supplied to an input of the device under test and in response to which the device under test generates the output signal; a reflected signal produced from the input of the device under test; and a reflected signal produced from the output of the device under test.

14. The system of claim 9, wherein the first frequency converter comprises:

a first mixer having two inputs connected respectively to an output of the DUT and an output of the LO, and having an output; and a first low pass filter having an input connected to the output of the first mixer and having an output for outputting the IF signal.

15. The system of claim 9, wherein the first measurement device comprises:

a sampler connected to the output of the first frequency converter and configured to sample the IF signal to produce IF samples;

an analog-to-digital converter configured to digitize the IF samples; and a digital signal processor configured to perform a digital Fourier transform on the digitized samples of the IF signal configured to determine the amplitude and phase of the IF signal as a function of frequency.

16. The system of claim 15, further comprising a trigger input configured to control timing of the sampler, wherein an input signal supplied to the device under test in response to which the device under test generates the output signal is a periodic signal, and wherein the sampler is synchronized to sample the IF signal at a same point in the periodic signal for each measurement of each portion of the output signal spectrum.

17. A method, comprising:

receiving from a device under test (DUT) an output signal having an output signal spectrum, the output signal spectrum comprising at least two frequency ranges which together span the output signal spectrum;

sequentially measuring an amplitude and a phase of the output signal as a function of frequency in each of the frequency ranges using a local oscillator (LO) signal whose frequency and phase are changed for each sequential measurement;

adjusting the measured phase of the output signal as the function of frequency for at least one of the frequency ranges to account for the change of phase in the LO signal from measurement of one frequency range to measurement of a next frequency range to produce phase-adjusted measurements of the output signal; and stitching together the phase-adjusted measurements of the output signal as the function of frequency in each of the frequency ranges to produce a measurement of the amplitude and phase of the output signal as a function of frequency across the output signal spectrum, wherein adjusting the measured phase as the function of frequency for at least one of the frequency ranges to account for the change of phase in the LO signal includes applying to the measured phase a phase offset determined from a first phase and a second phase of a converted pilot tone, provided by mixing a pilot tone having a pilot tone frequency with the LO signal, which are measured, respectively, before and after the frequency and phase of the LO signal change from measurement of one frequency range to measurement of the next frequency range, and wherein the pilot tone frequency of the pilot tone remains substantially unchanged in measuring the first phase of the converted pilot tone as in measuring the second phase of the converted pilot tone.

18. The method of claim 17, further comprising after measuring the first and second phases of the converted pilot tone, and before changing the frequency of the LO signal again, changing the pilot tone frequency of the pilot tone, wherein an amount by which the frequency of the LO signal is changed for each sequential measurement is about equal to an amount by the which the pilot tone frequency of the pilot tone is changed.

19. The method of claim 17, further comprising:
receiving a second signal, having a second signal spectrum comprising at least two second frequency ranges which together span the second signal spectrum;
sequentially measuring an amplitude and phase of the second signal as a function of frequency in each of the second frequency ranges using the LO signal whose frequency and phase are changed for each sequential measurement;
adjusting the measured phase of the second signal as the function of frequency for at least one of the second frequency ranges to account for the change of phase in the LO signal from measurement of one second frequency range to measurement of a next second frequency range to produce phase-adjusted measurements of the second signal; and stitching together the phase-adjusted measurements of the second signal as the function of frequency in each of the second frequency ranges to produce a measurement of the amplitude and phase of the second signal as a function of frequency, wherein adjusting the measured phase of the second signal as the function of frequency for at least one of the second frequency ranges to account for the change of phase in the LO signal includes applying the phase offset to the measured phase of the second signal, and wherein the second signal is one of: an input signal which is also supplied to an input of the device under test and in response to which the device under test generates the output signal; a reflected signal produced from the input of the device under test; and a reflected signal produced from the output of the device under test.

20. The method of claim 17, wherein the phase offset is a difference between: (1) the first phase of the converted pilot tone measured prior to changing the frequency of the LO signal in a preceding measurement, and (2) the second phase of the converted pilot tone measured after changing the frequency of the LO signal in a current measurement.

* * * * *